(12) United States Patent
Yamada et al.

(10) Patent No.: US 8,075,047 B2
(45) Date of Patent: Dec. 13, 2011

(54) AUTOMOTIVE VEHICLE BODY STRUCTURE

(75) Inventors: Takayuki Yamada, Wako (JP); Yusuke Takayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 12/361,796

(22) Filed: Jan. 29, 2009

(65) Prior Publication Data

US 2009/0195019 A1     Aug. 6, 2009

(30) Foreign Application Priority Data

Feb. 1, 2008   (JP) ................................. 2008-022367

(51) Int. Cl.
*B62D 25/08* (2006.01)
*B62D 21/00* (2006.01)
(52) U.S. Cl. ..................................... 296/193.09; 296/30
(58) Field of Classification Search ............. 296/193.09, 296/193.07, 193.06, 187.09, 187.08, 203.03, 296/203.02, 70, 30
See application file for complete search history.

(56) References Cited

U.S. PATENT DOCUMENTS

| 4,669,776 | A | * | 6/1987 | Harasaki | 296/203.02 |
| 5,560,674 | A | * | 10/1996 | Tazaki et al. | 296/193.01 |
| 6,364,401 | B1 | * | 4/2002 | Kim | 296/203.02 |
| 7,059,667 | B2 | * | 6/2006 | Tomita | 296/203.03 |

FOREIGN PATENT DOCUMENTS

JP          5270443        10/1993

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

An automotive vehicle body structure including a dash panel separating an engine room from a passenger compartment, a front pillar extending vertically along each outboard edge of the dash panel and a wheel house portion connected between an outboard edge of the dash panel and an opposing side of a lower part of the front pillar, a reinforcing member extends along a boundary between the outboard edge of the dash panel and wheel house portion and defines a closed cross section jointly with the dash panel and wheel house. The wheel house portion has a three dimensional contour bulging toward the passenger compartment and relatively high rigidity to reinforce the dash panel by reinforcing the boundary between the wheel house portion and dash panel. The impact load applied to the dash panel during a frontal crash is evenly distributed to various structural parts and a favorable crash safety is achieved.

18 Claims, 6 Drawing Sheets

US 8,075,047 B2

AUTOMOTIVE VEHICLE BODY STRUCTURE

TECHNICAL FIELD

The present invention relates to an automotive vehicle body structure, and in particular to a dash panel structure that can ensure a high vehicle body rigidity without diminishing the available space of the passenger compartment.

BACKGROUND OF THE INVENTION

In a previously proposed automotive vehicle body, a reinforcing member joining a front side frame and a front side pillar to each other is provided on a front side of a dash panel so that a load acting upon the front side frame may be transmitted to major members such as a front pillar and a side sill that form the passenger compartment. Such a reinforcing member is required to be provided in a relatively rear part of the vehicle body so as to avoid a wheel house receiving a wheel therein in front of the dash panel on either lateral side thereof because the wheel house is required to occupy a significant space to allow the wheel to be steered. See Japanese patent No. 2936877, for instance.

According to this proposal, the reinforcing member is placed in a rear part of the wheel house, and necessitates the dash panel to be located more rearward than desired so as to accommodate the reinforcing member. This is undesirable because it diminishes the available space of the passenger compartment.

BRIEF SUMMARY OF THE INVENTION

In view of such problems of the prior art, a primary object of the present invention is to provide a vehicle body structure that can increase the rigidity of a front part of the vehicle body without substantially diminishing the available space of the vehicle body.

A second object of the present invention is to provide a vehicle body structure that is simple and economical to implement but effective in reinforcing the vehicle body.

According to the present invention, such an object can be accomplished by providing an automotive vehicle body structure, comprising a dash panel separating an engine room from a passenger compartment, a front pillar extending vertically along each outboard edge of the dash panel, and a wheel house portion connected between an outboard edge of the dash panel and an opposing side of a lower part of the front pillar. The automotive vehicle body structure further comprising a reinforcing member extending along a boundary between the outboard edge of the dash panel and wheel house portion and defining a closed cross section jointly with the dash panel and wheel house.

The wheel house portion is typically provided with a three dimensional contour bulging toward the passenger compartment, and given with a relatively high rigidity so that it is enabled to reinforce the dash panel by reinforcing the boundary between the wheel house portion and dash panel. If desired, the wheel house portion may be provided with at least one horizontal bead for reinforcement. Thereby, the impact load that may be applied to the dash panel, for instance, at the time of a frontal crash, can be evenly distributed to various structural parts of the vehicle body, and a favorable crash safety can be achieved. Furthermore, because the reinforcement member is placed in a relatively recessed part in the boundary between the dash panel and wheel house portion, the impact of the reinforcement member on the available space of the passenger compartment can be minimized.

Because the wheel house portion bulges into the passenger compartment, it is structurally more advantageous to attach the reinforcing member to the dash panel and wheel house from a side of the passenger compartment. According to a preferred embodiment of the present invention, the reinforcing member comprises a channel member including a bottom wall, a pair of side walls extending from either side edge of the bottom wall, a first flange extending from a free end edge of one of the side walls and attached to the dash panel and a second flange extending from a free end edge of the other side wall and attached to the wheel house portion. In particular, to maximize the effectiveness of the reinforcement member, the closed cross section preferably has a gravitational center line that passes through a line passing through the boundary and perpendicular to the dash panel.

In a particularly preferred embodiment of the present invention, the dash panel comprises a vertical portion and a leg portion bent from a lower edge of the vertical section and extending substantially in parallel with a floor panel, and the reinforcing member extends along outboard edges of both the vertical portion and left portion. The dash panel may further comprise a dash upper that extends forward from the upper edge of the vertical portion. Also, the vehicle body typically further comprises a pair of front side frames each extending from a front side of the dash panel on either lateral side thereof.

According to another embodiment of the present invention, the boundary between the dash panel and wheel house portion is formed as a bead having an arcuate cross section, a convex side of the arcuate cross section facing and projecting toward a side of the engine room. The reinforcing member comprises a first reinforcing member consisting of a tubular member fixedly placed on a concave side of the bead. The reinforcing member further comprises a second reinforcing member including a main portion conforming to and placed against a side of the tubular member facing the passenger compartment, and a pair of flanges extending from either side edge of the main portion and fixedly attached to the dash panel and wheel house portion, respectively.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
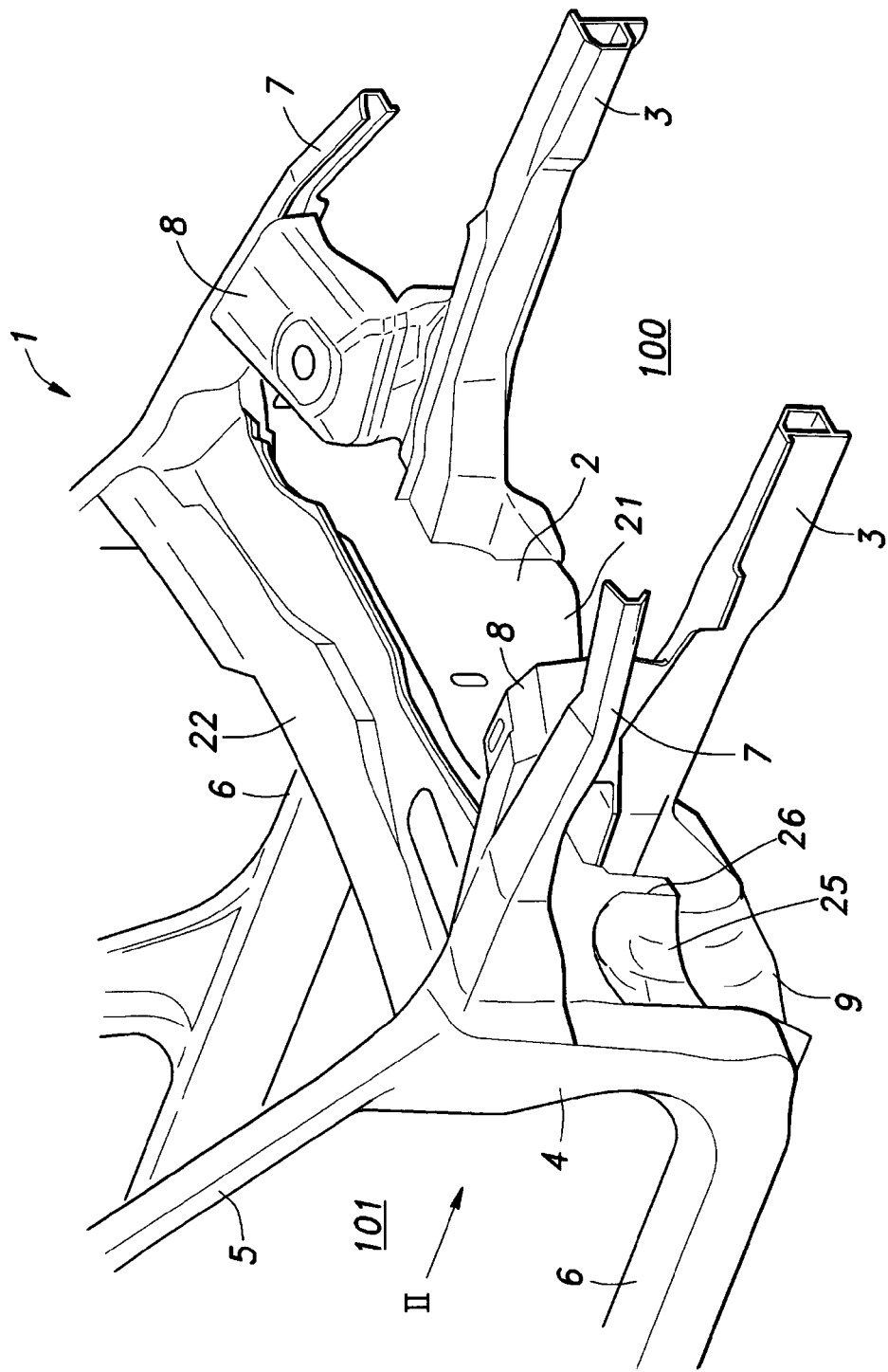
FIG. 1 is a fragmentary perspective view of a front part of a vehicle body embodying the present invention.

Referring to FIG. 1, a vehicle body 1 embodying the present invention comprises a dash panel 2 that separates a passenger compartment 101 from an engine room 100, a pair of front side frames 3 extending forwardly from the front side of the dash panel 2 on either lateral side of the vehicle body 1, and a pair of front pillar lowers 4 extending vertically along either side edge of the dash panel 2. The vehicle body 1 further including a pair of front pillar uppers 5 each extending integrally upwardly from the upper end of the corresponding front pillar lower 4, a pair of side sills 6 each extending integrally rearwardly from the lower end of the corresponding front pillar lower 4, a pair of upper members 7 each extending forwardly from the corresponding front pillar lower 4 and a pair of damper housings 8 each connected between the corresponding front side frame 3 and upper member 7. These components may be welded to each other (typically by spot welding) or stamp formed as integral pieces.

The illustrated vehicle body 1 is generally symmetric with respect to a central longitudinal line, but only one side of the vehicle body 1 may be described in the following to simplify the description, and avoid redundancy.

Figure 2:
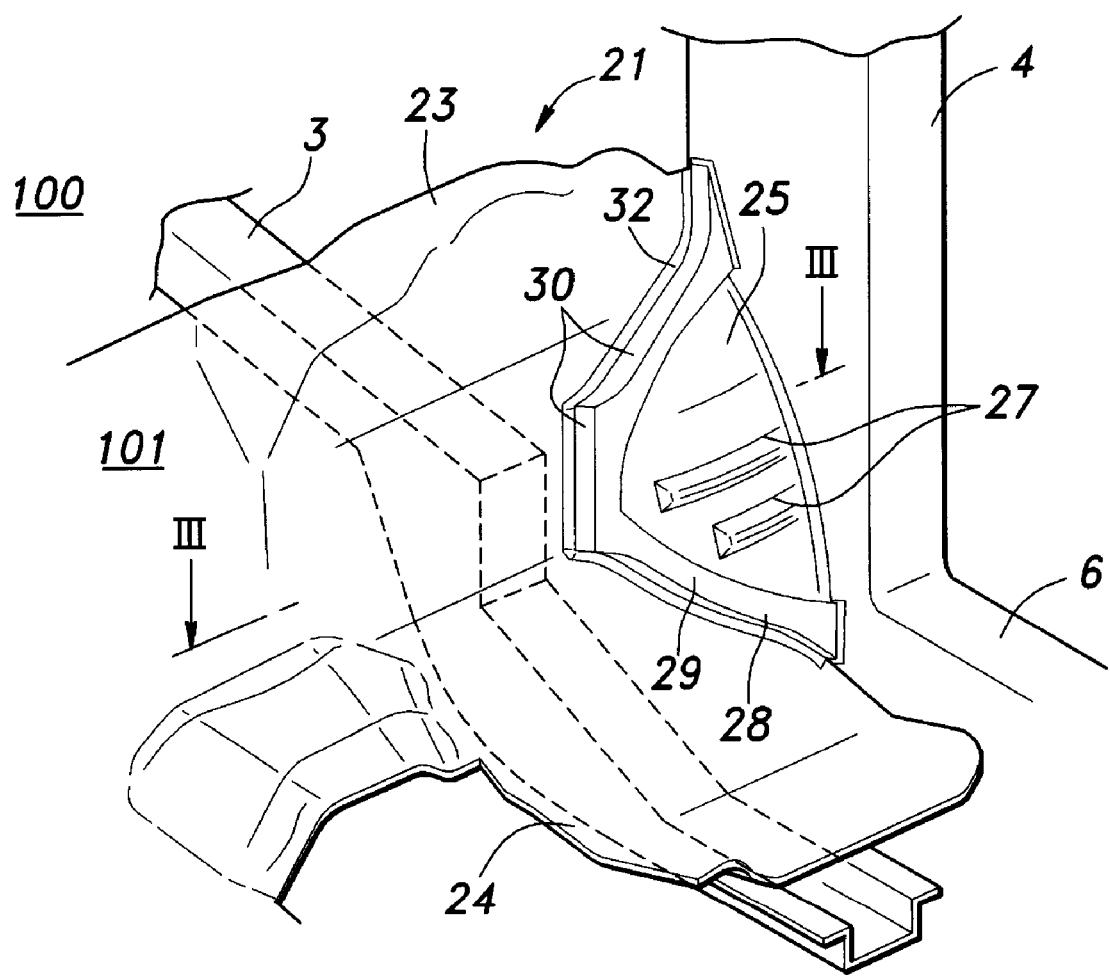
FIG. 2 is a fragmentary perspective view as seen from the direction indicated by arrow II in FIG. 1.

The dash panel 2 comprises a dash lower 21 forming a main part of the dash panel 2 and a dash upper 22 extending horizontally forward from the upper edge of the dash lower 21. The dash lower 21 may be considered as a main part of the dash panel 2 while the dash upper 22 may be considered as an extension therefrom. As shown in FIG. 2, the dash lower 21 comprises a vertical portion 23, a leg portion 24 extending rearward from the lower edge of the vertical portion 23 and a pair of wheel house portions 25 each extending along the corresponding side edges of the vertical portion 23 and leg portion 24 in a part-spherical shape with a convex surface facing upward or the passenger compartment 101. The rear edge of the leg portion 24 of the dash lower 21 is connected to a floor panel not shown in the drawing, and extends in parallel with the floor panel. The base end of each front side frame 3 extends along the front surface of a lower part of the vertical portion 23 and the lower surface of the leg portion 24, and the entire length of the base end of the front side frame 3 is welded to the vertical portion 23 and leg portion 24.

Each wheel house portion 25 is defined by a boundary 26 from the vertical portion 23 and leg portion 24 of the dash panel 2, and is provided with a three dimensional or spherical contour bulging toward the passenger compartment 101. The wheel house portion 25 also adjoins with the front pillar lower 4, and defines a wheel house in cooperation with a corresponding outrigger 9. The wheel house portion 25 may be provided with beads 27, preferably extending horizontally, to increase the rigidity thereof. The outboard edge of the wheel house portion 25 is connected to the front pillar lower 4 in the illustrated embodiment, but may also be additionally connected to the side sill 6.

The boundary 26 between the wheel house portion 25 and dash panel 2 or the vertical portion 23 and leg portion 24 thereof is provided with a reinforcing member 28 which is attached to the boundary 26 from the interior of the passenger compartment 101, and extends, preferably, over the entire length of the boundary 26. The two ends of the reinforcing member 28 are welded to the front pillar lower 4. One of the two ends of the reinforcing member 28 may also be welded to the side sill 6, instead of the front pillar lower 4. The reinforcing member 28 may have a larger thickness or may be made of material having a greater rigidity than the dash panel 2 and/or wheel house portion 25. The reinforcing member extends 28 continuously over the entire length of the boundary 26 in the illustrated embodiment, but may also have breaks or may terminate short of the front pillar lower 4 or side sill 6, if desired, without departing from the spirit of the present invention.

Figure 3:
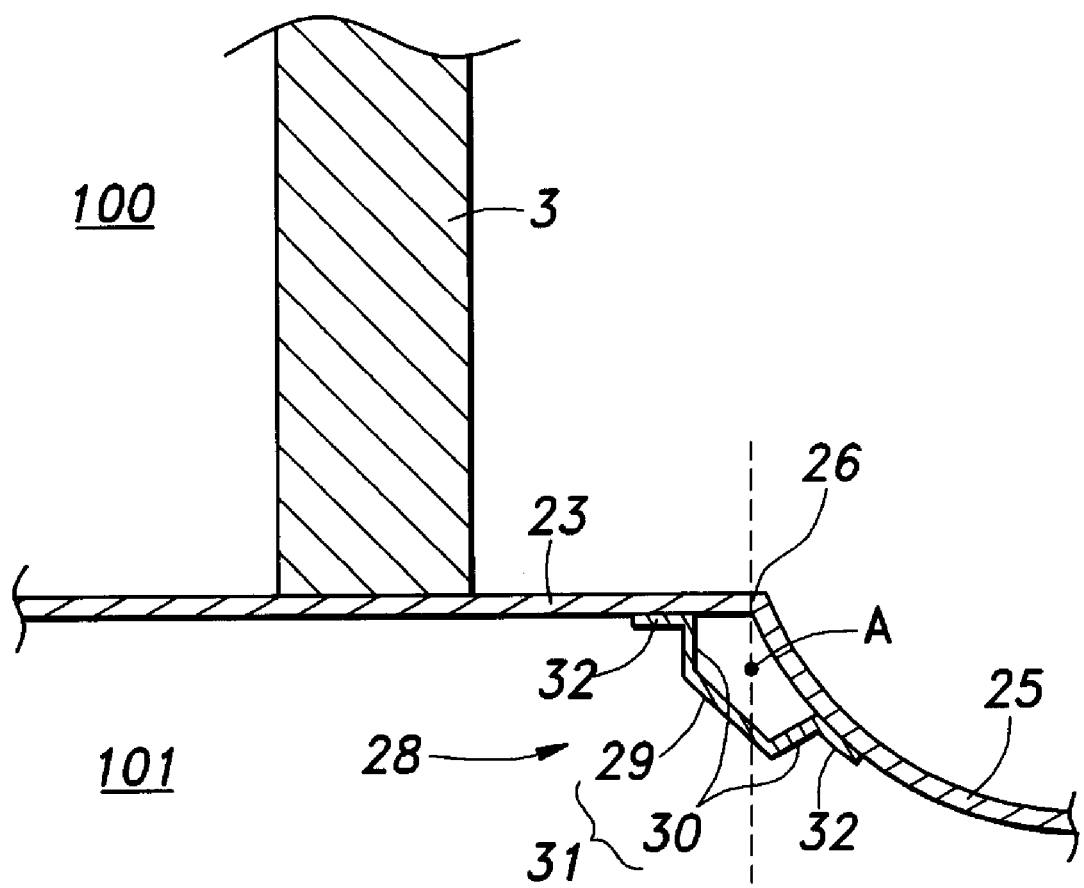
FIG. 3 is a sectional view taken along line III-III of FIG. 2.

As shown in FIG. 3, the reinforcing member 28 includes a channel portion 31 including a flat bottom wall 29 and a pair of side walls 30 extending from either side edge of the bottom wall 29 at a certain (blunt) angle. The other edge of each side wall 30 is provided with an external flange 32 by which the reinforcing member 28 is welded to the dash panel 2 or wheel house portion 25 as the case may be. The reinforcing member 28 increases the rigidity, in particular the bending rigidity of the boundary 26 between the dash panel 2 and wheel house portion 25. In this conjunction, it is preferable if the gravitational center A of the closed cross section of the reinforcing member 28 is located on a line passing through the boundary 26 perpendicularly to the major surface of the vertical portion 23 of the dash panel lower 21 as seen in the cross section of FIG. 3.

The mode of operation of the illustrated embodiment is described in the following. At the time of a frontal crash or an offset crash, the load acting on the front side frame 3 acts upon the front face of the vertical portion 23 of the dash lower 21. Also, the front side frame 3 is constantly subjected to a load from the damper housing 8 when the vehicle is traveling.

Figure 4:
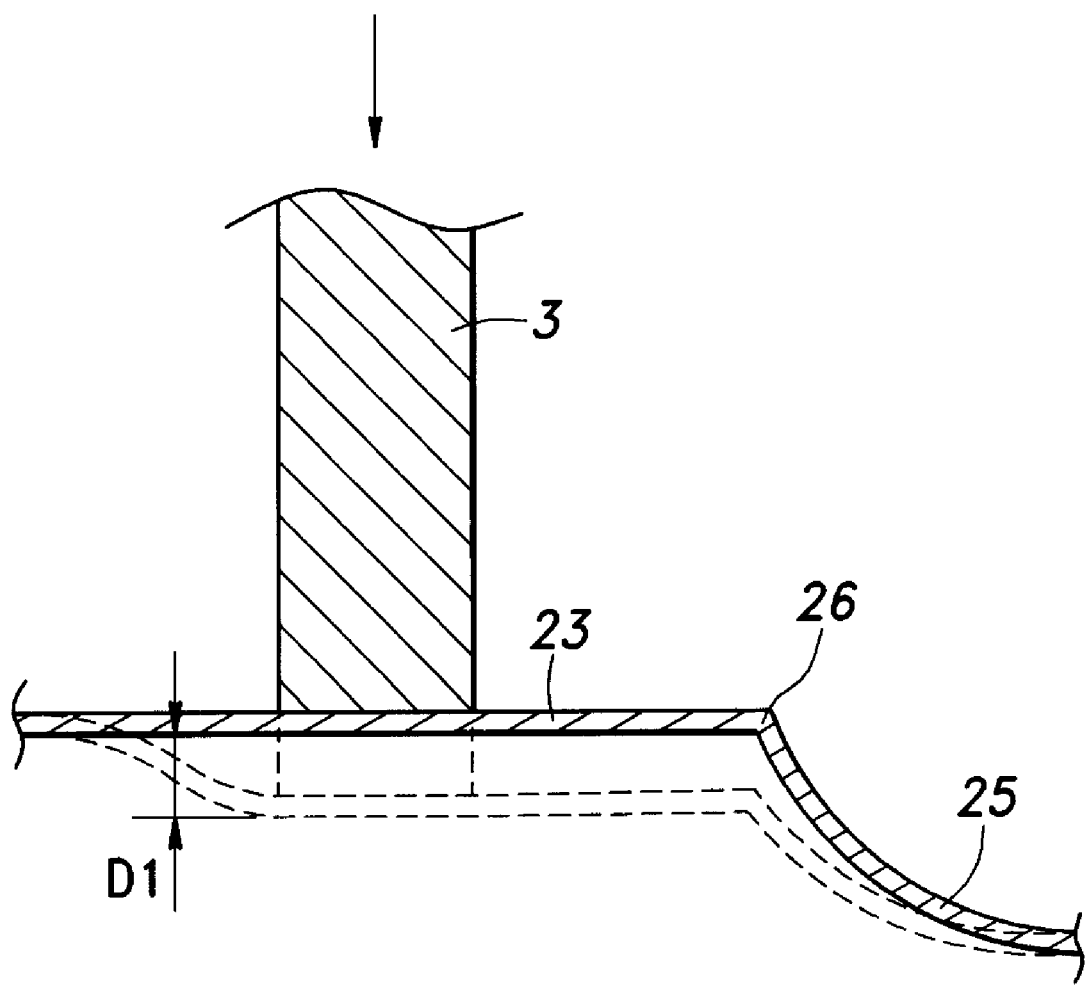
FIG. 4 is a view similar to FIG. 3 showing the mode of deformation of a dash panel when a load of a frontal crash is applied to the vehicle body according to a conventional arrangement.

In the conventional arrangement illustrated in FIG. 4, when the vertical portion of the dash lower 21 is pushed rearward by the front side frame 3 as indicated by an arrow, for instance, at the time of a frontal crash, the wheel house portion 25 along with the vertical portion 23 of the dash lower 21 deflects rearward as indicated by dotted lines. The wheel house portion 25 typically has a higher rigidity than the vertical portion 23 because the wheel house portion 25 is three dimensionally curved. However, the dash lower 21 tends to readily deflect because of a large span length when combined with the wheel house portion 25, and the wheel house portion 25 contributes very little in increasing the resistance of the dash lower 21 against deformation.

Figure 5:
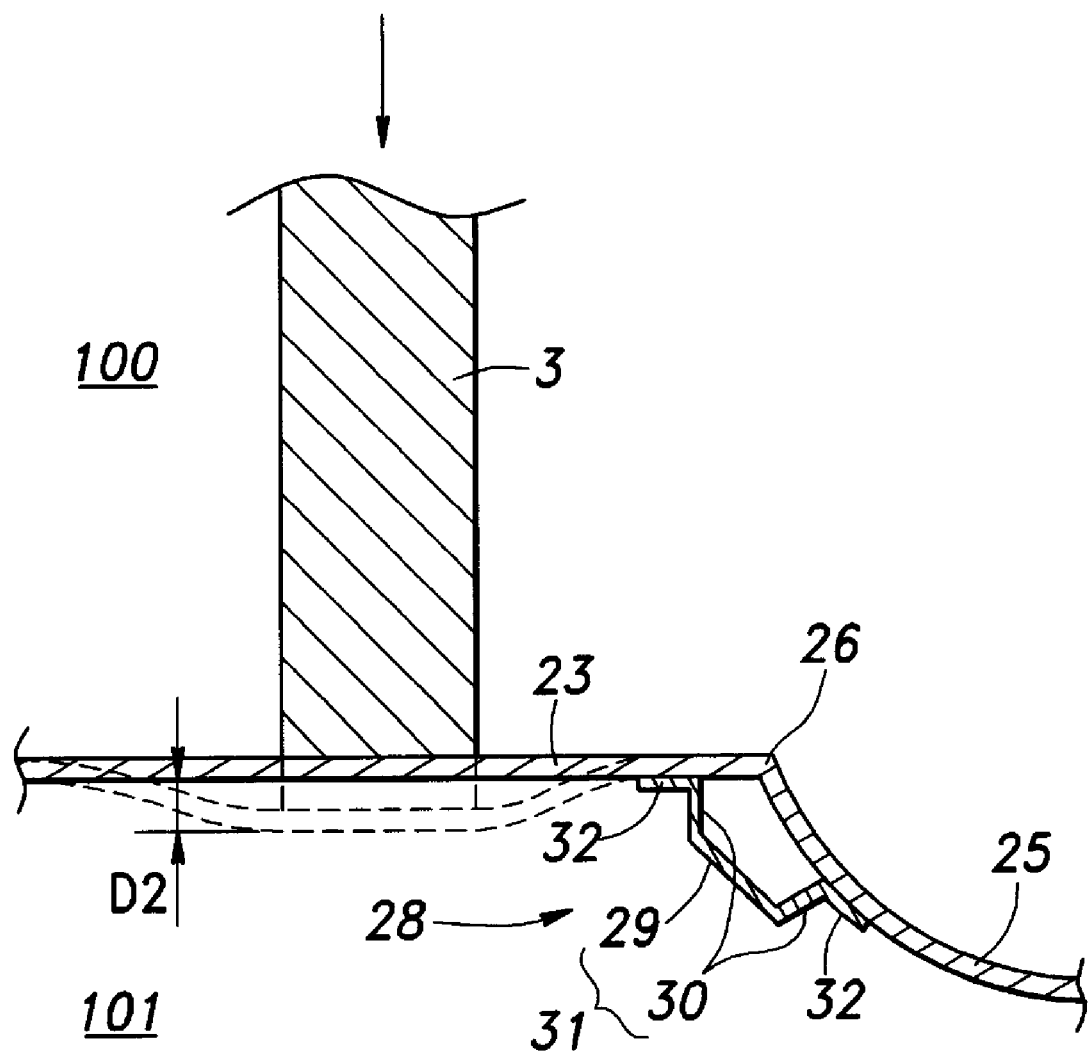
FIG. 5 is a view similar to FIG. 3 showing the mode of deformation of a dash panel when a load of a frontal crash is applied to the vehicle body according to the present invention.

On the other hand, in the arrangement according to the present invention illustrated in FIG. 5, because the reinforcing member 28 is provided along the boundary 26 between the dash lower 21 and wheel house portion 25, the boundary 26 is made more resistant to bending that in the conventional arrangement when the dash lower 21 is pushed rearward by the front side frame 3 so that the wheel house portion 25 becomes more effective in reinforcing the dash lower 21 against deformation. In other words, the dash lower 21 is supported by the wheel house portion 25 at the boundary 26 owing to the provision of the reinforcing member that increases the rigidity of the boundary 26. Furthermore, the boundary 26 extends along a curvilinear path around the wheel house portion 25, and this also contributes to an increase in the overall rigidity of the dash lower 21.

As a result, the deflection of the dash lower 21 at the time of a frontal crash can be reduced from D1 (conventional arrangement) to D2 (present invention). Owing to the reduced deflection of the dash lower 21, the load acting upon the front side frame 3 is transmitted and evenly distributed to the major components such as the front pillar lower 4 and side sill 6 that form the passenger compartment 101, via the vertical portion 23 of the dash lower 21, wheel house portion 25 and reinforcing member 28. Thus, the vehicle body 1 of the illustrated embodiment can minimize the deflection of the dash panel 2 at the time of a crash, and transmit and distribute the impact load to other components that have greater capacities to absorb impact energy.

According to the illustrated embodiment, because the dash panel 2 is given with a high rigidity owing to the reinforcing member 28, the need for other reinforcing members for the dash panel 2 may be omitted. Typically, a dash panel reinforce member extending across the front face of the dash panel 2 was conventionally used to connect the front side frames to each other, and between the front side frame and front pillar. In such a conventional arrangement, because of the presence of the wheel house portion between the front side frame and front pillar lower, the dash panel reinforcement member is required to be located behind the wheel house to avoid interferences with the wheel house. This inevitably diminished the available space of the passenger compartment. The present invention can eliminate the need for such dash panel reinforcement members, and this contributes to the reduction in the weight of the vehicle body and the maximization of the available space of the passenger compartment.

More specifically, the illustrated embodiment can result in the reduction in the overall weight of the vehicle body 1 owing to a more advantageous allocation of various structural members. Also, because, the dash panel 2 can be brought closer to the wheel house, the available space of the passenger compartment 101 can be increased. Although the illustrated embodiment requires the reinforcement member 28, as it is located in the boundary 26 which is somewhat recessed in the overall contour of this region, the impact of the reinforcement member 28 on the available space of the passenger compartment can be minimized.

Because the increase in the rigidity of the vehicle body 1 of the illustrated embodiment owes at least partly to the high rigidity of the wheel house portion 25 resulting from the three dimensional shape thereof, the relatively small and light-weight reinforcement member 28 is effectively enabled to increase the overall rigidity of the dash panel.

Figure 6:
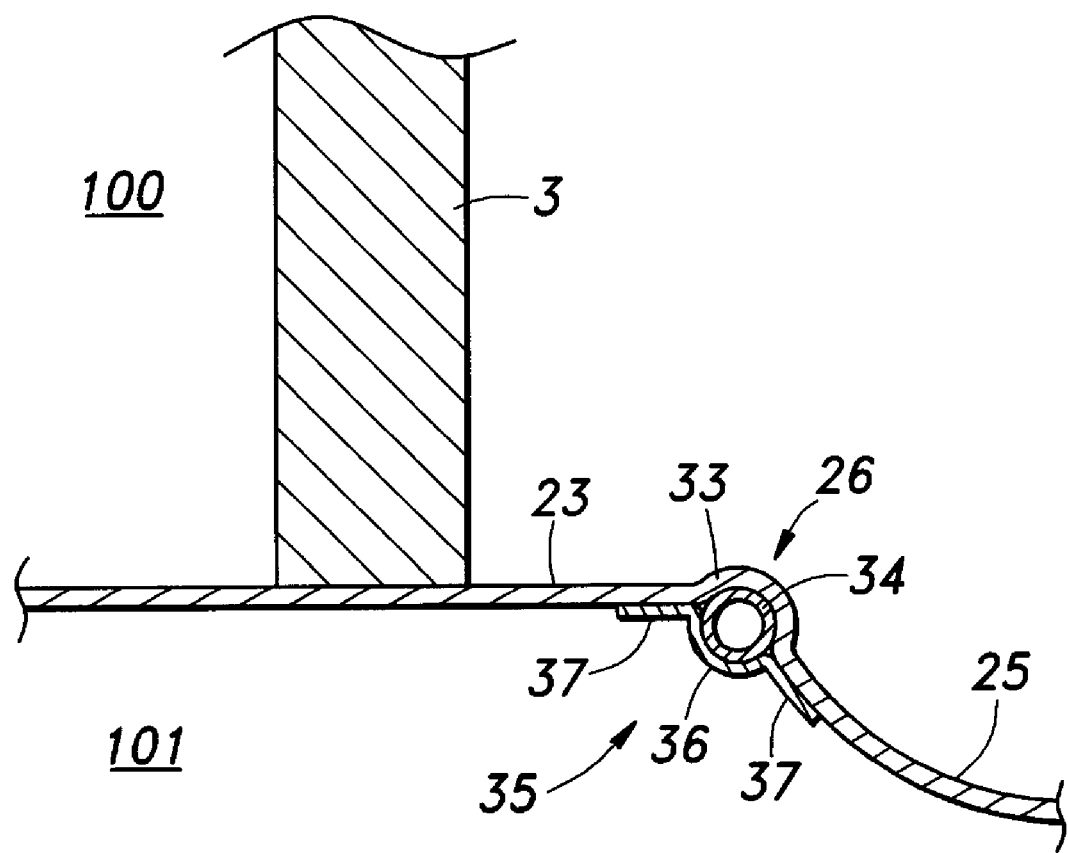
FIG. 6 is a view similar to FIG. 3 showing a second embodiment of the present invention.

FIG. 6 shows a second embodiment of the present invention. This embodiment is similar to the previous embodiment in many aspects, and some of the parts of this embodiment corresponding those of the previous embodiment are denoted with like numerals without repeating the description of such parts.

The boundary 26 in the previous embodiment consisted of a curvilinear bend formed by a simple fold line between the dash lower and wheel house portion. However, in this embodiment, the boundary 26 consists of a curvilinear bend formed by a bead 33 (having a part-circular or arcuate cross section) between the dash lower and wheel house portion. The bead 33 has a concave side facing the passenger compartment 101, and a convex side facing and bulging toward the engine room or wheel house. On the concave side of the bead 33 is placed a first reinforcement member 34 consisting of a tubular member having a contour conforming to the concave side of the bead 33. A second reinforcement member 35 is placed over the first reinforcement member 34 from the side of the passenger compartment 101. The second reinforcement member 35 comprises a bead portion 36 conforming to the opposing side of the first reinforcement member 34 and a pair of flanges 37 extending laterally from either lateral side of the bead portion 36 and welded to the dash lower and wheel house portion 25, respectively. The first and second reinforcement members 34 and 35 may be formed with material having a higher rigidity than the dash panel 2 or steel sheet having a greater thickness that the dash lower 21 and/or wheel house portion 25. The first reinforcement member 34 may be welded or otherwise bonded to at least one of the bead portion 36 of the second reinforcement member 35 and boundary 26 between the dash lower and wheel house portion.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An automotive vehicle body structure, comprising:
 a dash panel separating an engine room from a passenger compartment;
 a front pillar extending vertically along each outboard edge of the dash panel;
 a wheel house portion connected between the outboard edge of the dash panel and an opposing side of a lower part of the front pillar, wherein the boundary between the dash panel and wheel house portion is formed as a bead having an arcuate cross section, a convex side of the arcuate cross section facing and projecting toward a side of the engine room; and
 a reinforcing member extending along a boundary between the outboard edge of the dash panel and wheel house portion and defining a closed cross section jointly with the dash panel and wheel house, wherein the reinforcing member is attached to the dash panel and wheel house from a side of the passenger compartment.

2. The automotive vehicle body structure according to claim 1, wherein the reinforcing member comprises a channel member including a bottom wall, a pair of side walls extending from either side edge of the bottom wall, a first flange extending from a free end edge of one of the side walls and attached to the dash panel and a second flange extending from a free end edge of the other side wall and attached to the wheel house portion.

3. The automotive vehicle body structure according to claim 1, wherein the closed cross section has a gravitational center line that passes through a line passing through the boundary and perpendicular to the dash panel.

4. The automotive vehicle body structure according to claim 1, wherein the dash panel comprises a vertical portion and a leg portion bent from a lower edge of the vertical section and extending substantially in parallel with a floor panel, and the reinforcing member extends along outboard edges of both the vertical portion and the leg portion.

5. The automotive vehicle body structure according to claim 1, further comprising a pair of front side frames each extending from a front side of the dash panel on either lateral side thereof.

6. The automotive vehicle body structure according to claim 1, wherein the wheel house portion is provided with a three dimensional contour bulging toward the passenger compartment.

7. The automotive vehicle body structure according to claim 6, wherein the wheel house portion is provided with at least one horizontal bead for reinforcement.

8. The automotive vehicle body structure according to claim 1, wherein the reinforcing member comprises a first reinforcing member consisting of a tubular member fixedly placed on a concave side of the bead.

9. The automotive vehicle body structure according to claim 8, wherein the reinforcing member further comprises a second reinforcing member including a main portion conforming to and placed against a side of the tubular member facing the passenger compartment, and a pair of flanges extending from either side edge of the main portion and fixedly attached to the dash panel and wheel house portion, respectively.

10. An automotive vehicle body structure, comprising:
 a dash panel extending laterally and separating an engine room from a passenger compartment, said dash panel having first and second outboard edges;
 first and second front pillars, each of said first and second front pillars having a lower part, said first front pillar extending vertically along the first outboard edge of the dash panel and said second front pillar extending vertically along the second outboard edge of the dash panel;

first and second wheel house portions, said first wheel house portion being connected between the first outboard edge of the dash panel and an opposing side of the lower part of the first front pillar, said second wheel house portion being connected between the second outboard edge of the dash panel and an opposing side of the lower part of the second front pillar; and first and second reinforcing members, said first reinforcing member extending along a first boundary between the first outboard edge of the dash panel and first wheel house portion and cooperating with the dash panel and the first wheel house portion to define a first closed cross section, said second reinforcing member extending along a second boundary between the second outboard edge of the dash panel and the second wheel house portion and cooperating with the dash panel and the second wheel house portion to define a second close cross section, wherein the first and second boundaries between the dash panel and wheel house portions are formed as first and second beads, respectively, having an arcuate cross section, a convex side of the arcuate cross section projecting toward a side of the engine room.

11. The automotive vehicle body structure according to claim 10, wherein each of the first and second reinforcing members comprise a tubular member fixedly placed on a concave side of the bead.

12. The automotive vehicle body structure according to claim 11, wherein each of the first and second reinforcing members further comprise a main portion conforming to and placed against a side of the tubular member facing the passenger compartment, and a pair of flanges extending from either side edge of the main portion and fixedly attached to the dash panel and the associated wheel house portion, respectively.

13. The automotive vehicle body structure according to claim 10, wherein each of the first and second reinforcing members is attached to the dash panel and associated wheel house portion from a side of the passenger compartment.

14. The automotive vehicle body structure according to claim 13, wherein each of the first and second reinforcing members comprises a channel member including a bottom wall, first and second side walls extending from opposite side edges of the bottom wall, a first flange extending from a free end edge of the first side wall and attached to the dash panel and a second flange extending from a free end edge of the second side wall and attached to the wheel house portion.

15. The automotive vehicle body structure according to claim 10, wherein each of the first and second closed cross sections have a gravitational center line that passes through a line passing through the associated one of the first and second boundaries and perpendicular to the dash panel.

16. The automotive vehicle body structure according to claim 10, wherein the dash panel comprises a vertical portion and a leg portion bent from a lower edge of the vertical section and extending substantially parallel to a floor panel, and the first and second reinforcing members along outboard edges of both the vertical portion and the leg portion.

17. The automotive vehicle body structure according to claim 10, further comprising first and second front side frames, said first front side frame extending from a first lateral front side of the dash panel and the second front side frame each extending from a second lateral front side of the dash panel.

18. The automotive vehicle body structure according to claim 10, wherein each of the wheel house portions is provided with a three dimensional contour bulging toward the passenger compartment and at least one horizontal reinforcing bead.

* * * * *